(12) United States Patent
Groves et al.

(10) Patent No.: US 6,896,921 B2
(45) Date of Patent: May 24, 2005

(54) METHOD OF REDUCING BACTERIA AND FAT CONTENT OF FOOD PRODUCTS

(75) Inventors: Billy M. Groves, Pine Bluff, AR (US); Francis M. Henderson, Mt. Ida, AR (US); Robert C. Wilson, Enumclaw, WA (US); Robin L. Forgey, Black Diamond, WA (US); Charles A. Winters, Sammamish, WA (US); Sandra E. Custer, Sammamish, WA (US)

(73) Assignee: Grovac Southern Select, L.C., Pine Bluff, AR (US)

( * ) Notice: Subject to any disclaimer, the term of this patent is extended or adjusted under 35 U.S.C. 154(b) by 281 days.

(21) Appl. No.: 10/263,532

(22) Filed: Oct. 2, 2002

(65) Prior Publication Data

US 2004/0067286 A1 Apr. 8, 2004

(51) Int. Cl.[7] .............................. A23B 4/26; A23L 1/314
(52) U.S. Cl. .......................... 426/231; 99/472; 99/535; 422/292; 426/281; 426/519; 426/641
(58) Field of Search ................................. 426/231, 281, 426/320, 519, 641; 99/472, 535; 366/139; 422/292

(56) References Cited

U.S. PATENT DOCUMENTS

| | | |
|---|---|---|
| 2,629,311 A | 2/1953 | Graves |
| 4,006,257 A | 2/1977 | Kolk |
| 5,281,428 A | 1/1994 | Morgan ........................ 426/312 |
| 5,374,433 A | 12/1994 | Bowling et al. |
| 5,514,030 A | 5/1996 | Suhner ......................... 452/141 |
| 5,543,163 A | 8/1996 | Groves |
| 5,576,035 A | 11/1996 | Bowling et al. |
| 5,846,594 A | 12/1998 | Zimmerman et al. |
| 5,976,005 A | 11/1999 | Wilson et al. ............... 452/173 |
| 6,086,833 A | 7/2000 | Conners et al. ............. 422/292 |

FOREIGN PATENT DOCUMENTS

| | | | | |
|---|---|---|---|---|
| EP | 0 985 349 A2 | 3/2000 | ............ | A23B/4/12 |
| WO | WO 02/15705 A2 | 2/2002 | ............ | A23B/4/26 |

*Primary Examiner*—George C. Yeung
(74) *Attorney, Agent, or Firm*—Baker Botts L.L.P.

(57) ABSTRACT

In one embodiment of the present invention a method for processing a plurality of food products includes loading the food products into a vacuum tumbler, filling the vacuum tumbler to a predetermined level with a processing solution having a pH level within a predetermined range, withdrawing air from the vacuum tumbler to create a partial vacuum, rotating the vacuum tumbler for a predetermined time period to expose the food products to the processing solution and the partial vacuum, periodically adding, during the predetermined time period, a predetermined amount of an organic acid to the processing solution to maintain the pH level within the predetermined range, and removing the food products from the vacuum tumbler after the predetermined time period.

40 Claims, 2 Drawing Sheets

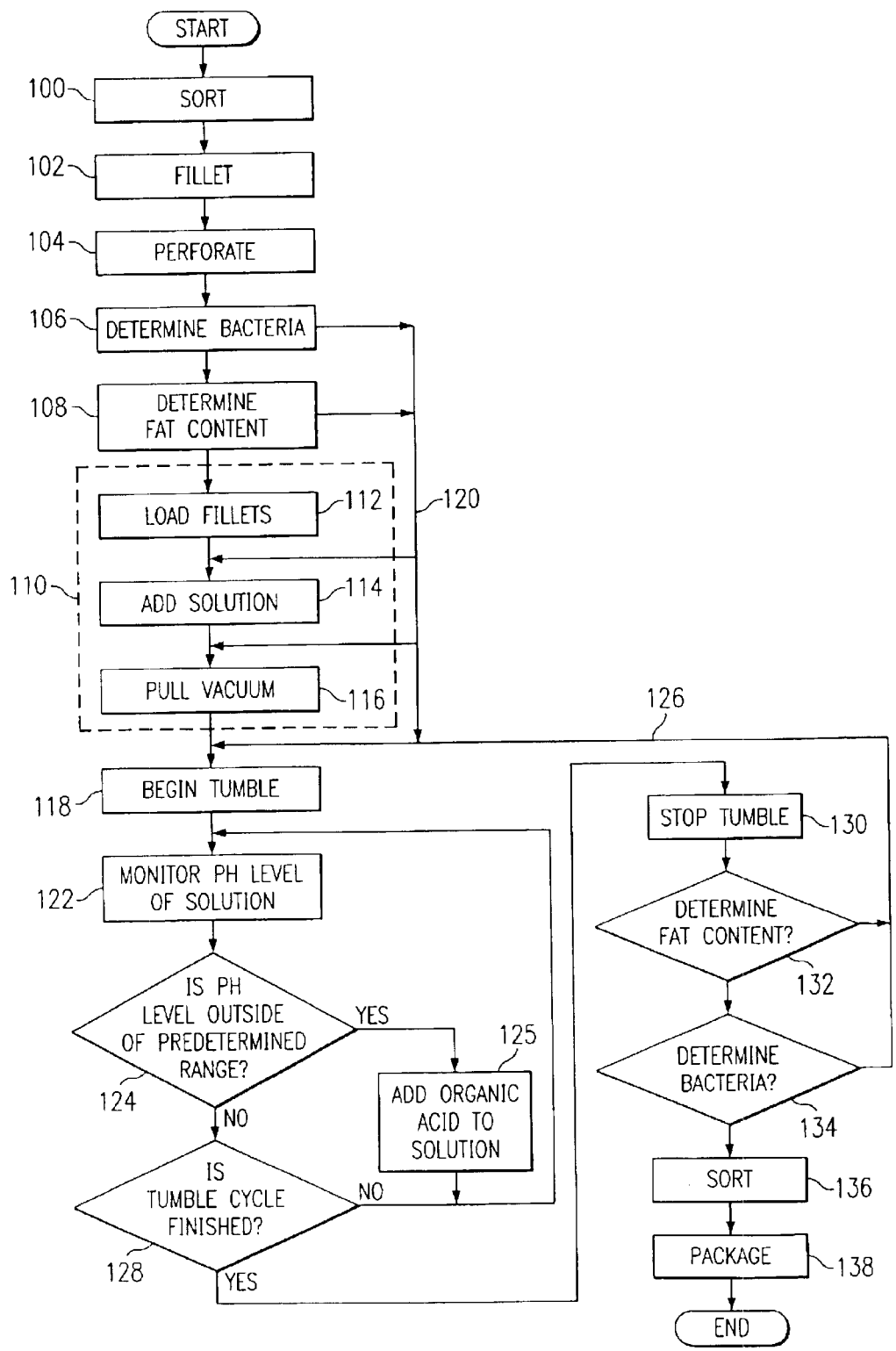

US 6,896,921 B2

METHOD OF REDUCING BACTERIA AND FAT CONTENT OF FOOD PRODUCTS

TECHNICAL FIELD OF THE INVENTION

This invention relates generally to the processing of food products and, more specifically, to a method for reducing bacteria and fat content of food products.

BACKGROUND OF THE INVENTION

The food processing industry is continually developing new approaches to preparing food products for human consumption. Generally, these approaches attempt to improve the overall consistency and quality of food products delivered to the consumer. In particular, food processors adopt various methods and systems to improve the flavor, shelf life, appearance, and nutrition of food products.

One approach to processing food products places the food product in a tumbler filled with a saline solution. The ham processing industry, for example, uses a tumbler to dramatically increase the water content of ham, sometimes as much as one hundred percent from its pre-tumbling weight. Another approach utilizes a tumbler partially evacuated and filled with a saline solution for alternately exposing the food products to the saline solution and partial vacuum. The hydration achieved using a vacuum tumbler is typically significantly lower than the hydration achieved when processing hams using a conventional tumbler.

Previous processing systems have experienced some limited success in enhancing the overall quality and consistency of food products. These previous approaches, however, have not adequately identified and extracted the major components, leading to low quality food products and bacterial contamination.

SUMMARY OF THE INVENTION

The present invention provides a method for reducing bacteria and fat content of food products that substantially eliminates or reduces the disadvantages and problems associated with previous methods and systems.

In one embodiment of the present invention a method for processing a plurality of food products includes loading the food products into a vacuum tumbler, filling the vacuum tumbler to a predetermined level with a processing solution having a pH level within a predetermined range, withdrawing air from the vacuum tumbler to create a partial vacuum, rotating the vacuum tumbler for a predetermined time period to expose the food products to the processing solution and the partial vacuum, periodically adding, during the predetermined time period, a predetermined amount of an organic acid to the processing solution to maintain the pH level within the predetermined range, and removing the food products from the vacuum tumbler after the predetermined time period.

Embodiments of the invention provide a number of technical advantages. Embodiments of the invention may include all, some, or none of these advantages. In one embodiment, improved shelf life of processed animal products is realized. The processing promotes microbial intervention, which greatly diminishes the bacteria count in the animal products and improves their shelf life without having to resort to potentially harmful radiation.

In another embodiment, a reduction in total fat content of the processed food products is realized. Cholesterol and triglycerides may also be reduced in certain animal products.

Another technical advantage includes enhanced appearance and taste of processed food products in some embodiments. Taste of the food products may be enhanced by removing chemicals contributing to an off-flavor problem. A combination of perforating and vacuum tumbling in a processing solution also produces food products with a fresher appearance and a more pleasant odor. Perforations allow greater penetration of the processing solution to reduce the fat content, lower the bacteria count, and extract off-flavor chemicals without sacrificing the appearance and integrity of the cellular membrane.

A further technical advantage is that a processing system may include a variety of sensors, including a pH sensor, under the central control of a computer. More particularly, a motor and vacuum source of a vacuum tumbler may be controlled by a computer in response to data received from an analyzer for measuring the fat content and/or bacteria count of the animal products. The processing time, processing rate, vacuum level, amount and pH level of the processing solution may be adjusted based on measurements of the unprocessed or processed food products. In one embodiment, the pH level of the processing solution is maintained based on schedules/tables stored in the computer without resorting to a pH sensor for sensing the pH level.

Other technical advantages of the present invention are readily apparent to one skilled in the art from the figures, descriptions, and claims included herein.

BRIEF DESCRIPTION OF THE DRAWINGS

For a more complete understanding of the present invention, and for further features and advantages, reference is now made to the following description taken in conjunction with the accompanying drawings, in which:

FIG. 2 is a flow diagram illustrating the sequence of process steps and information flow of the process of FIG. 1.

DETAILED DESCRIPTION OF THE INVENTION

Figure 1:
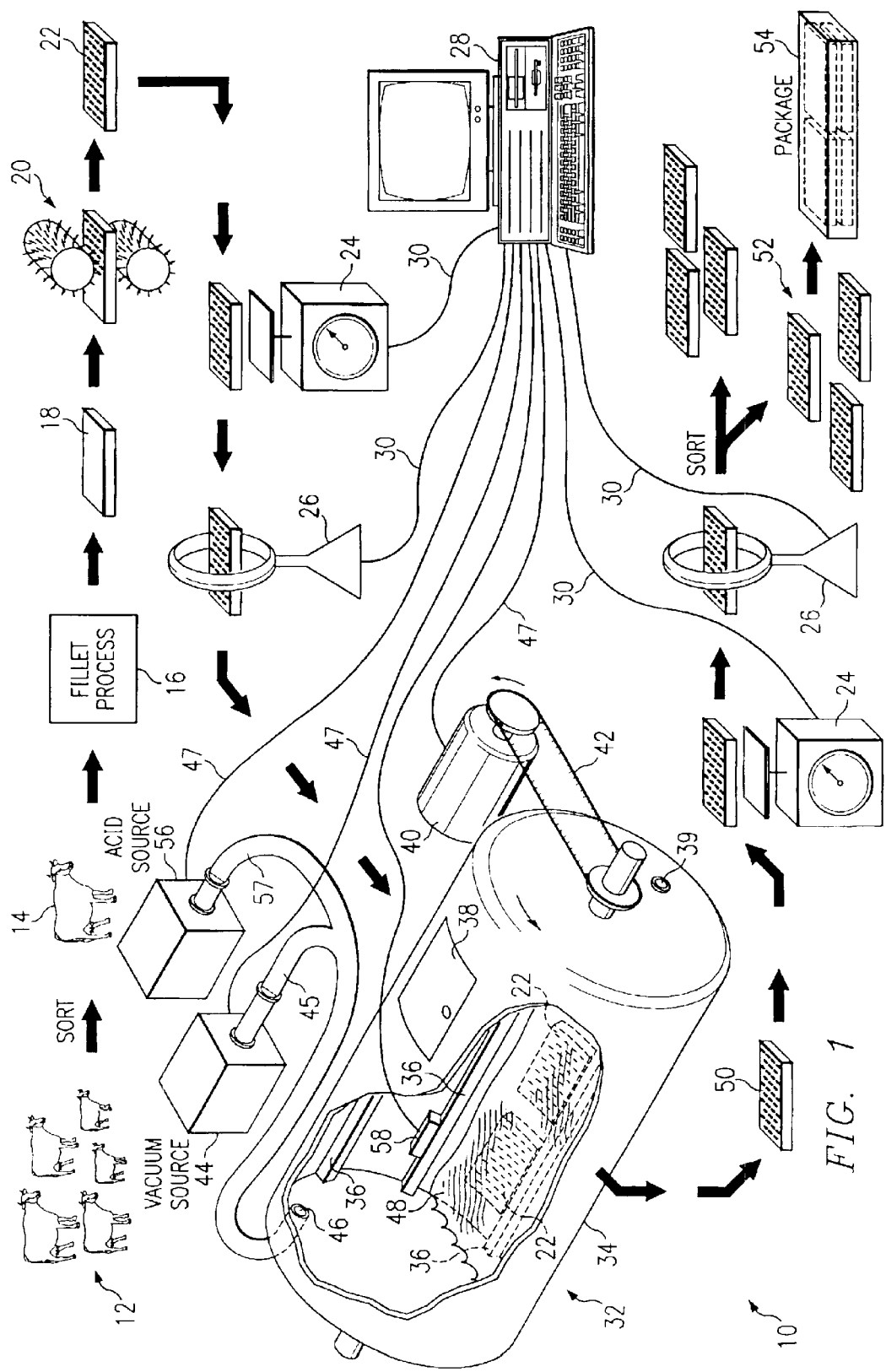
FIG. 1 illustrates the processing steps and components of a process for processing food products in accordance with one embodiment of the present invention.

The present invention and some of its technical advantages are best understood by referring to FIGS. 1 and 2 of the drawings, like numerals being used for like and corresponding parts of the various drawings.

The present invention contemplates a method for processing food products, such as those derived from animal products, and a system for carrying out the method. The present invention is described herein with reference to processing red meat, but other suitable food products may be processed with minor variation and similar success. For example, the present invention may be used with success on chicken, shrimp, fish, and even fruit.

It is believed that the present invention reduces the total fat content of processed food products and potentially reduces cholesterol and triglycerides in certain animal products. In addition, and perhaps more importantly, it is believed that the present invention improves shelf life of processed animal products by reducing bacteria in the animal products. To facilitate these advantages, and other advantages, the present invention uses several mechanical and chemical aspects.

For example, one mechanical aspect of the present invention is vacuum tumbling, which enhances cleaning and exposes greater cellular membrane area to the process.

Vacuum tumbling may also contribute to bacterial lysis, which improves the shelf life of the food products. Another mechanical aspect of one embodiment of the present invention is tissue perforation, especially of the membrane covering areas, which assures uniform and more extensive exposure of the food products to vacuum processing.

Various chemical aspects of the present invention also enhance the quality and flavor of the food products and improve their shelf life. A hypotonic saline solution enhances osmosis into the cellular structure, which contributes significantly to bacterial lysis and fat reduction. An organic acid additive, such as citric or ascorbic acid, also adjusts and maintains the pH of the processing solution so as to facilitate some of the technical advantages as described above. The same organic acid additive or another chosen organic acid may also be used to re-establish the integrity of the cellular membrane in some embodiments.

FIG. 1 illustrates the process steps and components of a process 10 for processing food products in accordance with one embodiment of the present invention. Process 10 is described herein with reference to red meat; however, process 10 may be used successfully with other suitable food products. The process steps performed in process 10 are shown in a particular order but may be performed in a different sequence without departing from the scope of the present invention. In addition, process steps may be performed at a single location or multiple locations.

Referring to FIG. 1, cattle 12 of varying shapes and sizes are gathered and sorted based on size, appearance, or other appropriate characteristics to select sorted cattle 14 appropriate for processing by process 10. Sorted cattle 14 are then processed by any suitable fillet process 16 to produce a plurality of fillets 18. For example, cattle 14 would have to be slaughtered and butchered to produces fillets 18. Fillet 18 is illustrated in FIG. 1 to be a de-boned and eviscerated fillet having a generally rectangular shape; however, fillet 18 may include bones, internal organs, and other portions not intended for human consumption, and may be any suitable shape or size. Fillet 18 is then ready for the various processing steps performed by process 10.

Fillets 18 may then be perforated by a perforator 20 to allow better tissue access during processing. Red meat typically does not have to be perforated, but perforation may be beneficial for some other food products. If utilized, perforator 20 may be a single roller with perforating protrusions or a pair of rollers as shown in FIG. 1. Other suitable perforators may be utilized. The resulting perforated fillets 22 (or unperforated fillets 18) may then be weighed at a scale 24 and analyzed for fat or lipid content and bacteria count by an analyzer 26. Both scale 24, which may be any suitable scale, and analyzer 26, which may be any suitable analyzer, may have the capability of transmitting data regarding the weight, fat content, and bacteria count of fillets 22 to a computer 28 over data collection lines 30. Analyzer 26 may also be adapted to measure cholesterol, triglycerides, or any other monitored component of fillets 22. Analyzer 26 may have the capability to perform flash chromatography to analyze each fillet 22 for bacteria count.

Fillets 22 are then loaded into a vacuum tumbler 32 for processing. Vacuum tumbler 32 comprises a cylindrical drum 34 mounted to rotate about a central axis. A motor 40 rotates cylindrical drum 34 either directly or through any appropriate transmission 42 using gears, pulleys, belts, or other suitable members. The present invention contemplates any suitable system that can impart a rotational velocity to cylindrical drum 34.

Affixed to the internal wall of cylindrical drum 34 are a plurality of ribs 36 extending substantially parallel to the axis of rotation of cylindrical drum 34. Ribs 36 ensure that fillets 22 are intermittently submersed in a processing solution 48 within cylindrical drum 34. Any suitable number of ribs 36 may be utilized. A door 38 provides access to the inside of cylindrical drum 34 and a drain 39 allows filling and draining of cylindrical drum 34 with processing solution 48.

Vacuum tumbler 32 also includes a vacuum source 44 coupled to cylindrical drum 34 through a conduit 45 and an access port 46. Vacuum source 44 may be coupled to cylindrical drum 34 by any suitable method that allows for free rotation of cylindrical drum 34. Vacuum source 44 functions to reduce the internal pressure of cylindrical drum 34, thereby creating a limited $O_2$ environment. In one embodiment, vacuum source 44 reduces the internal pressure of cylindrical drum 34 to at least twenty-five inches of mercury (Hg). The specific vacuum level may be adjusted based on the age and condition of fillets 22, as well as other factors.

Partially filling the inside of cylindrical drum 34 is processing solution 48. In one embodiment, processing solution 48 is a hypotonic saline solution comprising (i) water in an amount no more than the weight of fillets 22, and (ii) sodium chloride (NaCl) in an amount no more than 0.9 percent of the weight of the water. Processing solution 48 may also be a hypotonic saline solution comprising (i) water in an amount no more than the weight of fillets 22, and (ii) sodium chloride in an amount no more than 3.8 percent of the weight of the water. Classifying processing solution as "hypotonic" depends on the tonicity of the food product being processed. For example, a hypotonic processing solution for land-based fresh water animals may include a sodium chloride content of no more than 0.9 percent of the weight of the water, whereas for salt water animals the sodium chloride content is typically no more than 3.8 percent of the weight of the water. Other suitable processing solutions 48 may be utilized within the scope of the present invention. Although the amount of processing solution 48 within cylindrical drum 34 should be no more than the weight of fillets 22, the amount may vary without departing from the scope of the present invention. In some embodiments, yeast may also be added to processing solution 48 in an amount of approximately 0.1 percent of fillets 22 to enhance the flavor of fillets 22.

An acid source 56 may be used to add an organic acid to cylindrical drum 34 via a conduit 57 and access port 46. In the illustrated embodiment, conduit 57 merges with conduit 45 to create one conduit that ends at access port 46. In other embodiments, conduit 57 is coupled to cylindrical drum 34 separately from conduit 45 by any suitable method that allows for free rotation of cylindrical drum 34. The organic acid may be added to adjust the pH of processing solution 48 within a range. For example, in one embodiment, a range of the pH level of processing solution 48 is from approximately 1.8 to approximately 7.0. In a more specific embodiment, a range of the pH level of processing solution 48 is between approximately 1.8 and approximately 3.8. The organic acid may be citric acid, ascorbic acid, or any other suitable acid.

Vacuum tumbler 32 may also include a pH sensor 58 that monitors the pH level of processing solution 48. pH sensor 48, which may be any suitable sensor adequate to determine the pH level of processing solution 48, may be suitably coupled to either a rib 36 or the inside surface of cylindrical drum 34. In other embodiments, pH sensor 58 is not present within cylindrical drum 34, such as in an "open loop" embodiment, as described more fully below.

In the illustrated embodiment, motor 40, vacuum source 44, acid source 56, and pH sensor 58 are all coupled to computer 28 through suitable control lines 47. Control lines 47 may be wireline connections (as shown) or suitable wireless connections. The interaction between computer 28 and motor 40, vacuum source 44, acid source 56, and pH sensor 58 is described in detail below.

After cylindrical drum 34 is tumbled for a time period, the partial vacuum is released and fillets 22 may be drained, rinsed, and redrained. The draining and rinsing steps (not shown) may be performed before or after removing fillets 22 from cylindrical drum 34. Processed fillets 50 may then be weighed by scale 24 and analyzed for fat or lipid content and bacteria count by analyzer 26. As described above, other monitored components of processed fillets 50 may be measured. Processed fillets 50 may weigh ten percent or more than unprocessed fillets 22 due to the hydration process during tumbling. Processed fillets 50 may contain significantly less fat, cholesterol, and triglycerides than unprocessed fillets 22 due to the decomposition and extraction processes during tumbling.

Processed fillets 50 are then sorted, and sorted fillets 52 are placed in appropriate packaging 54. Packaging 54 may be any suitable packaging, such as ice packing for fresh production or individual quick-freeze processing for frozen product packaging.

Computer 28, which may be any suitable computer, receives data on unprocessed fillets 22 and processed fillets 50 from scale 24 and analyzer 26 before and after the tumbling cycle over data collection lines 30. In addition, computer 28 may receive data from pH sensor 58 over a control line 47. Computer 28 may then process this data, via any suitable control module, and issue control signals to motor 40, vacuum source 44, and acid source 56 over control lines 47 in response to stored data and elapsed time.

In operation of one embodiment of a tumbling cycle of vacuum tumbler 32, cylindrical drum 34 is partially filled with processing solution 48 having a pH level within a desired range. Fillets 22 are loaded into the cylindrical drum 34 before a partial vacuum is pulled therein via vacuum source 44. Motor 40 and transmission 42 then begin to rotate cylindrical drum 34 at a predetermined rate. During the tumbling, pH sensor 58 monitors the pH level of processing solution 48. When pH sensor 58 senses that the pH level is outside of the desired range, then this information is sent to computer 28 so that computer 28 can direct acid source 56 to deliver an amount of organic acid to processing solution 48 to maintain the pH level of processing solution 48 within the desired range. This pH level monitoring continues until the tumbling cycle is finished. A typical tumbling cycle is anywhere from four to thirty minutes depending on the type of food product being processed and other suitable factors. Other tumbling cycle times are contemplated by the present invention. When adding the organic acid, computer 28, via control lines 47, directs the valve associated with conduit 45 of vacuum source 44 to shut off the vacuum, and directs the valve associated with conduit 57 of acid source 56 to open so that organic acid may be added.

The tumbling cycle just described may be referred to as a "closed loop" system. In another embodiment of the invention, an "open loop" system is employed, in which pH sensor 58 is not present and organic acid is delivered to cylindrical drum 34 at predetermined time intervals without any feedback communicated to computer 28. For example, organic acid may be delivered to cylindrical drum 34 based on a schedule maintained in a storage area of computer 28 to maintain the pH level of processing solution 48 within a predetermined range. This schedule may be based on historical and/or experimental data for a particular type of food product, a desired fat content for a particular food product, a desired bacterial count for a particular food product, or other suitable factors. Other systems for maintaining the pH level of processing solution 48 within a desired range are contemplated by the present invention.

FIG. 2 is a flow diagram that illustrates a sequence of process steps performed by process 10, including the information flow between computer 28, scale 24, analyzer 26, motor 40, vacuum source 44, acid source 56, and pH sensor 58. Process steps shown in FIG. 2 may be performed in various sequences without departing from the scope of the present invention.

Food processing begins with a sort of the animal products to be processed at step 100. The animal products are filleted at step 102 and the resulting fillets may be perforated at step 104. The bacteria count of fillets 22 are determined at step 106 and their fat content determined at step 108.

The following group of steps designated by dashed block 110 prepares vacuum tumbler 32 for processing. Fillets 22 are loaded into cylindrical drum 34 at step 112 and processing solution 48 is added to cylindrical drum 34 at step 114. Cylindrical drum 34 is then evacuated to create a partial vacuum at step 116 via vacuum source 44.

The tumbling process is then begun at step 118. During the tumbling process, the pH level of processing solution 48 is monitored at step 122 by pH sensor 58. At decision step 124, if it is determined that the pH level is outside of a desired range, then organic acid is added to processing solution 48 at step 125. pH sensor 58 continues to monitor the pH level of processing solution 48 during the tumbling process until the tumble cycle is finished, as determined at step 128. When the tumbling cycle is finished, then the tumbling cycle is stopped at step 130.

In one embodiment of the present invention, data generated at steps 106 and 108 are fed forward to determine the amount and composition of processing solution added at block 114, the level of the partial vacuum created at block 116, and the predetermined rate and predetermined time period for the tumbling cycle. In this embodiment, computer 28 receives data on unprocessed fillets 22 from scale 24 and analyzer 26 via control lines 30 and controls motor 40, vacuum source 44, and acid source 56 in response to that data via control lines 47. The information flow for determining the operating characteristics of vacuum tumbler 32 are shown by feed-forward lines 120 in FIG. 2.

At block 132, the fat content of processed fillets 50 are determined. And, at step 134, the bacteria count of processed fillets are determined. If it is determined at either of steps 132 or 134 that either the fat content or bacteria count are unacceptable for processed fillets 50, then a retumble may be performed back at step 118, as denoted by feedback line 126. If the fat content and bacteria count are acceptable, then processed fillets 50 are sorted at step 136 and packaged at step 138.

Although the present invention is described with several embodiments, various changes and modifications may be suggested to one skilled in the art. In particular, the present invention is described with reference to red meat, but may apply to other animal products with little alteration and similar results. Furthermore, the present invention contemplates several process steps that may be performed in the sequence described or in an alternative sequence without departing from the scope of the present invention. The present invention is intended to encompass such changes and modifications as they fall within the scope of the appended claims.

What is claimed is:

1. A method for processing a plurality of food products, comprising:
   rotating a vacuum tumbler for a time period to expose the food products to a processing solution and a partial vacuum;
   monitoring a pH level of the processing solution during the time period;
   periodically adding, during the time period, an amount of an organic acid to the processing solution in response to the monitoring to maintain the pH level of the processing solution within a range; and
   removing the food products from the vacuum tumbler after the time period.

2. The method of claim 1, further comprising:
   loading the food products into the vacuum tumbler;
   filling the vacuum tumbler to a level with the processing solution having the pH level within the range; and
   withdrawing air from the vacuum tumbler to create the partial vacuum.

3. The method of claim 2, wherein filling the vacuum tumbler to a level with the processing solution comprises filling the vacuum tumbler with an amount of processing solution no more than the weight of the food products.

4. The method of claim 1, wherein the processing solution comprises:
   water in an amount no more than the weight of the food products; and
   sodium chloride in an amount no more than a predetermined percent of the weight of the water.

5. The method of claim 4, wherein the amount of sodium chloride is no more than 0.9 percent of the weight of the water.

6. The method of claim 4, wherein the amount of sodium chloride is no more than 3.8 percent of the weight of the water.

7. The method of claim 1, wherein the range of the pH level is from approximately 1.8 to approximately 7.0.

8. The method of claim 1, wherein the range of the pH level is from approximately 1.8 to approximately 3.8.

9. The method of claim 1, further comprising perforating the food products.

10. The method of claim 1, further comprising rinsing the food products after rotating the vacuum tumbler for the time period.

11. The method of claim 1, further comprising measuring the fat content of the food products after rotating the vacuum tumbler for the time period.

12. The method of claim 1, further comprising analyzing the food products for bacteria count after rotating the vacuum tumbler for the time period.

13. The method of claim 2, wherein withdrawing air from the vacuum tumbler to create the partial vacuum reduces the internal pressure of the vacuum tumbler to at least 25 inches of mercury.

14. The method of claim 1, wherein periodically adding, during the time period, an amount of an organic acid to the processing solution comprises adding the amount of the organic acid to the processing solution based on a predetermined schedule.

15. A method for processing a plurality of food products, comprising:
    loading the food products into a vacuum tumbler;
    filling the vacuum tumbler to a level with a processing solution having a pH level within a range;
    withdrawing air from the vacuum tumbler to create a partial vacuum;
    rotating the vacuum tumbler for a time period to expose the food products to the processing solution and the partial vacuum;
    monitoring the pH level of the processing solution during the time period;
    periodically adding, in response to the monitoring, an amount of an organic acid to the processing solution when the pH level of the processing solution reaches a predetermined level to maintain the pH level within the range; and
    removing the food products from the vacuum tumbler after the time period.

16. The method of claim 15, wherein periodically adding, during the time period, an amount of an organic acid to the processing solution comprises adding the amount of the organic acid to the processing solution based on a predetermined schedule to maintain the pH level within the range.

17. The method of claim 15, further comprising perforating the food products.

18. The method of claim 15, further comprising rinsing the food products after rotating the vacuum tumbler for the time period.

19. The method of claim 15, further comprising measuring the fat content of the food products after rotating the vacuum tumbler for the time period.

20. The method of claim 15, further comprising analyzing the food products for bacteria count after rotating the vacuum tumbler for the time period.

21. The method of claim 15, wherein filling the vacuum tumbler to a level with a processing solution comprises filling the vacuum tumbler with an amount of processing solution no more than the weight of the food products.

22. The method of claim 15, wherein the processing solution comprises:
    water in an amount no more than the weight of the food products; and
    sodium chloride in an amount no more than a predetermined percent of the weight of the water.

23. The method of claim 22, wherein the amount of sodium chloride is no more than 0.9 percent of the weight of the water.

24. The method of claim 22, wherein the amount of sodium chloride is no more than 3.8 percent of the weight of the water.

25. The method of claim 15, wherein the range of the pH level is from approximately 1.8 to approximately 7.0.

26. The method of claim 15, wherein the range of the pH level is from approximately 1.8 to approximately 3.8.

27. The method of claim 15, wherein withdrawing air from the vacuum tumbler to create a partial vacuum reduces the internal pressure of the vacuum tumbler to at least 25 inches of mercury.

28. A system for processing a plurality of food products, comprising:
    a vacuum tumbler adapted to receive the food products and to receive a processing solution having a pH level within a range;
    a vacuum source coupled to the vacuum tumbler, the vacuum source operable to create a partial vacuum inside the vacuum tumbler;
    an organic acid source coupled to the vacuum tumbler, the organic acid source operable to deliver an amount of an organic acid to the processing solution when the pH level of the processing solution reaches a predetermined level to maintain the pH level within the range; and a pH sensor coupled to an inside surface of the vacuum tumbler, the pH sensor operable to monitor the pH level of the processing solution.

29. The system of claim 28, further comprising a plurality of ribs coupled to an internal wall of the vacuum tumbler and extending substantially parallel to the axis of rotation of the vacuum tumbler, the plurality of ribs adapted to support the food products and expose the food products to the processing solution and the partial vacuum as the vacuum tumbler rotates.

30. The system of claim 28, further comprising a computer coupled to the pH sensor and the organic acid source, the computer operable to receive the pH level of the processing solution from the pH sensor and to direct the organic acid source to deliver an organic acid to the processing solution in response to the received pH level to maintain the pH level within the range.

31. The system of claim 30, wherein the computer is further coupled to the vacuum source and further operable to shut down the vacuum source to allow the organic acid to be delivered to the processing solution.

32. The system of claim 28, further comprising a computer coupled to the organic acid source, the computer operable to direct the organic acid source to deliver the amount of the organic acid to the processing solution based on a schedule maintained in a storage area of the computer.

33. The system of claim 28, further comprising a perforator for perforating the food products.

34. The system of claim 28, further comprising an analyzer operable to measure the fat content of the food products.

35. The system of claim 28, further comprising an analyzer operable to measure the bacteria count of the food products.

36. A system for processing a plurality of food products, comprising:

a vacuum tumbler adapted to receive the food products and to receive a processing solution;

a motor coupled to the vacuum tumbler to rotate the vacuum tumbler;

a vacuum source coupled to the vacuum tumbler, the vacuum source operable to create a partial vacuum inside the vacuum tumbler;

a plurality of ribs coupled to an internal wall of the vacuum tumbler and extending substantially parallel to the axis of rotation of the vacuum tumbler, the plurality of ribs adapted to support the food products and expose the food products to the processing solution and the partial vacuum as the vacuum tumbler rotates;

a pH sensor coupled to an inside surface of the vacuum tumbler, the pH sensor operable to monitor a pH level of the processing solution;

an organic acid source coupled to the vacuum tumbler, the organic acid source operable to deliver an amount of organic acid to the processing solution; and a computer coupled to the pH sensor and the organic acid source, the computer operable to receive the pH level of the processing solution from the pH sensor and to direct the organic acid source to deliver organic acid to the processing solution in response to the received pH level.

37. The system of claim 36, further comprising a perforator for perforating the food products.

38. The system of claim 36, further comprising an analyzer operable to measure the fat content of the food products.

39. The system of claim 36, further comprising an analyzer operable to measure the bacteria count of the food products.

40. The system of claim 36, wherein the computer is further coupled to the vacuum source and further operable to shut down the vacuum source to allow the organic acid to be delivered to the processing solution.

* * * * *